United States Patent [19]
Plew

[11] 3,935,660
[45] Feb. 3, 1976

[54] NOISEMAKING DEVICE FOR USE WITH FISHING LURE OR BAIT AND METHOD OF MAKING SAME

[76] Inventor: Franklin T. Plew, P.O. Box 1418, Bloomington, Ind. 47401

[22] Filed: Mar. 17, 1975

[21] Appl. No.: 559,221

[52] U.S. Cl. ............ 43/42.31; 43/42.24; 43/42.37; 43/42.53
[51] Int. Cl.² .......................................... A01K 85/00
[58] Field of Search............ 43/42.31, 42.24, 42.37, 43/42.38, 42.53, 44.4

[56] References Cited
UNITED STATES PATENTS

| | | | |
|---|---|---|---|
| 2,741,864 | 4/1956 | Shotton | 43/42.31 X |
| 2,778,143 | 1/1957 | Bratz, Sr. | 43/42.31 X |
| 2,787,858 | 4/1957 | Best | 43/42.38 X |
| 3,760,528 | 9/1973 | Moore | 43/42.24 |
| 3,802,115 | 4/1974 | Auten et al. | 43/42.31 |

*Primary Examiner*—Louis G. Mancene
*Assistant Examiner*—Daniel J. Leach
*Attorney, Agent, or Firm*—Jenkins, Hanley & Coffey

[57] ABSTRACT

A noisemaking device for use with a fishing lure or bait to enhance its attractiveness to fish comprises a container formed of two flanged deep cups held together by a length of heat-shrinkable tubing and loosely containing one or more metal balls. The device may be molded into an artificial lure or may be attached directly to a fish hook or wire harness for use with an artificial lure or live bait.

14 Claims, 7 Drawing Figures

NOISEMAKING DEVICE FOR USE WITH FISHING LURE OR BAIT AND METHOD OF MAKING SAME

BACKGROUND OF THE INVENTION

Several types of noisemaking artificial fishing lures are known. Such lures generally include one or more metal balls loosely held in a cavity in the lure so that they will rattle in use. In some cases, the balls are inserted during the manufacture of the lure. Examples of this type of noisemaking fishing lure include Bratz U.S. Pat. No. 2,778,143, Wenger U.S. Pat. No. 2,659,176, Dorsett U.S. Pat. No. 3,044,207, and Moore U.S. Pat. No. 3,760,528.

In other cases, the balls are held in a container which is manufactured separately from the lure and is later added to the lure. An example of this is Auten et al, U.S. Pat. No. 3,802,115.

The present invention provides an improved and inexpensive noisemaking device which is a self-contained and sealed unit and is especially adapted to be molded in place in a plastic molded body, such as a soft-molded lure, or otherwise inserted during the manufacture of a lure, and which has a shape to facilitate such molding and to hold the unit in place in the body. The unit is also adapted to be used in other ways with fishing rigs or with fish hooks or lines baited with live bait. The device has improved noisemaking characteristics because of its materials and construction.

SUMMARY OF THE INVENTION

In accordance with the invention, a noisemaking unit is made from a pair of deep cup-shaped metal stampings with flanges at their open ends, which are assembled with their open, flanged ends together and with preferably one but permissably two or more metal balls loosely received within the cups. The cups are secured and sealed together by a short length of heat-shrinkable tubing shrunk in place about the meeting flanged ends. The metal stampings used may resemble closed-end eyelet stampings and may be inexpensively made on the same machines. The cups are desirably of brass and the balls of steel, to produce the best noise.

The assembled units are especially advantageous to be molded in place in plastic molded lure bodies of various types and shapes and of either soft or hard plastic. In such use, their flanged shape aids in locating them in fixed position. They may also be combined with fish hooks or jigs, or with a yoke having eyes at its ends for attachment to a line. Such combinations may be made by heat shrinking a plastic tube about an assembly of the noise-making unit with the hook or yoke, or by molding a body of plastic about such an assembly.

BRIEF DESCRIPTION OF THE DRAWINGS

The accompanying drawings illustrate the invention and show examples of preferred embodiments. In such drawings.

DESCRIPTION OF THE PREFERRED EMBODIMENT

Figure 1:
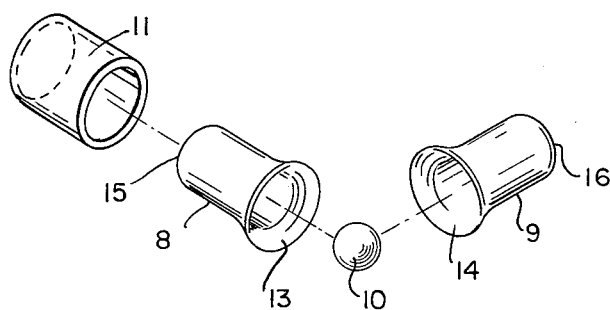
FIG. 1 is an exploded view of the components used in making a noisemaking device in accordance with the invention.

A noisemaking device embodying the present invention is desirably made from the parts shown in FIG. 1. These comprise two identical deep-drawn cups 8 and 9. The cup 8 has a closed end 15 and an open end which carries an outwardly radiating flange 13. The second cup 9 includes a closed end 16 and an open, flanged end 14. A metal ball 10 of a diameter smaller than the inside diameter of the cups is loosely received in the container formed by the cups, and the cups are held together by a section of heat shrinkable tubing 11 having a normal size sufficient to slide easily but snugly over the flanges 13 and 14 of tubes 8 and 9. Tubing 11 may be of any suitable substance which is impervious to water and shrinks upon heating. Common examples of such materials are polytetrafluoroethylene, polyvinyl chloride, and polyolefin. The tubing 11 is shown as transparent but may be translucent or opaque and may be of any desired color.

Figure 2:
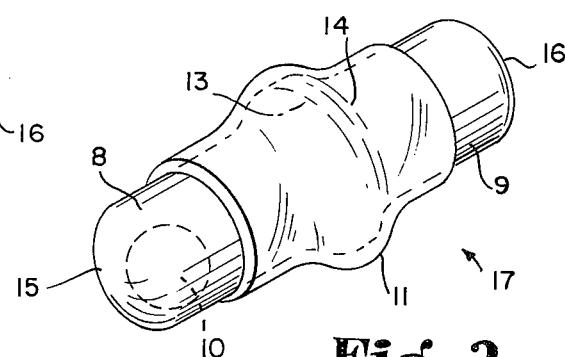
FIG. 2 is a side elevation of the assembled device.

The components of FIG. 1 are assembled to form the noisemaking device 17 shown in FIG. 2. In such assembly, the metal ball 10 is inserted in either of the cups 8 or 9, such cups are brought together with their flanged ends 13 and 14 in abutting relationship, and the heat shrinkable tubing 11 placed about the abutting flanged ends 13 and 14. Sufficient heat is then applied to shrink the tubing 11 snugly about the assembled cups. Tubing 11 may be selected so that it fits snugly over the flanged ends 13 and 14 of the metal cups 8 and 9 for retaining them in assembled configuration for later batch processing of the assembled containers. The subsequent heating forms a sealed container in which the metal ball 10 is loosely contained and is free to roll back and forth between the cups 8 and 9 and against their ends so as to create a noticeable clicking noise as it strikes the walls and ends of the cups. A plurality of metal balls 10 may be used instead of the single ball shown, but I consider a single ball to give best results. The clicking noise is believed to enhance the attractiveness of the bait or lure to a fish.

Figure 3:
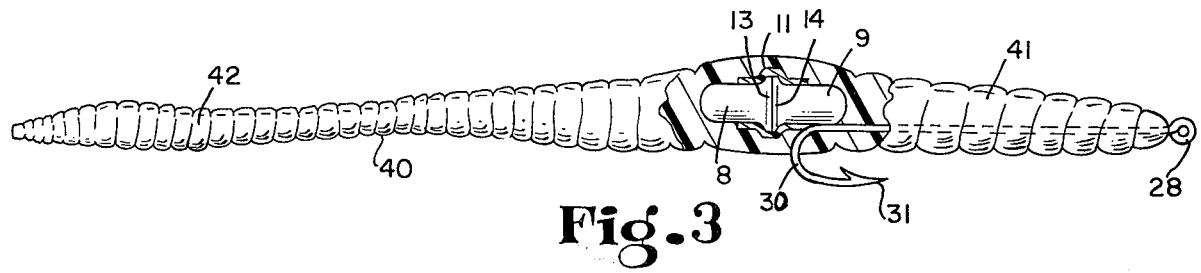
FIG. 3 is a view showing a device in accordance with the invention molded into a worm-like soft plastic body which also contains a metal fish hook.

The noisemaking device can be used in various ways. As shown in FIG. 3, a noisemaking device 17 assembled as in FIG. 2 is molded into a soft plastic bodied artificial lure 40 in the form of an earthworm having a head portion 41 and a tail portion 42. A hook 30 is also molded into the worm 40 with its eyelet 28 exposed for attaching a fishing line and with its point 31 exposed at the base of the head 41. In this embodiment, the noisemaking device 17 of FIG. 2 is not integrally connected to the hook 30, but the noisemaking device and hook are separately positioned in the mold cavity used in making the lure 40 before the mold cavity is filled with plastic. Alternatively, the noisemaking device 17 may be attached to the hook 30 as by an outer heat-shrunk tubing before the two are inserted in the mold.

Figure 4:
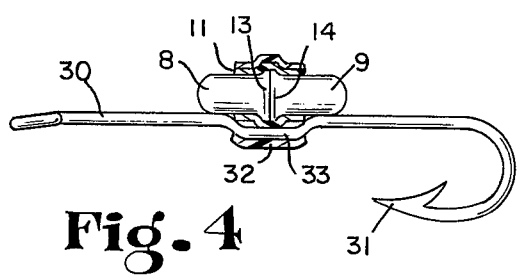
FIG. 4 is a side view of a device assembled directly to a metal fish hook by means of an outer heat-shrink tube.

Such an assembly of a noisemaking device 17 and a fish hook 30 is shown in FIG. 4. The device 17 is made as previously described. The shank of the fish hook 30 is desirably offset to form a notch 33 to accommodate the joined flanges 13 and 14 of the device 17. The device 17 and the hook are brought together and an outer sleeve 32 of heat-shrinkable tubing is placed about them and heated to shrink it in place. This forms a self-contained assembly which can be used as such by attaching it to a fishing line and baiting the hook with a bait such as a minnow, earthworm or pork rind. Alternatively, the assembly may be molded into a soft-bodied plastic lure.

Figure 5:
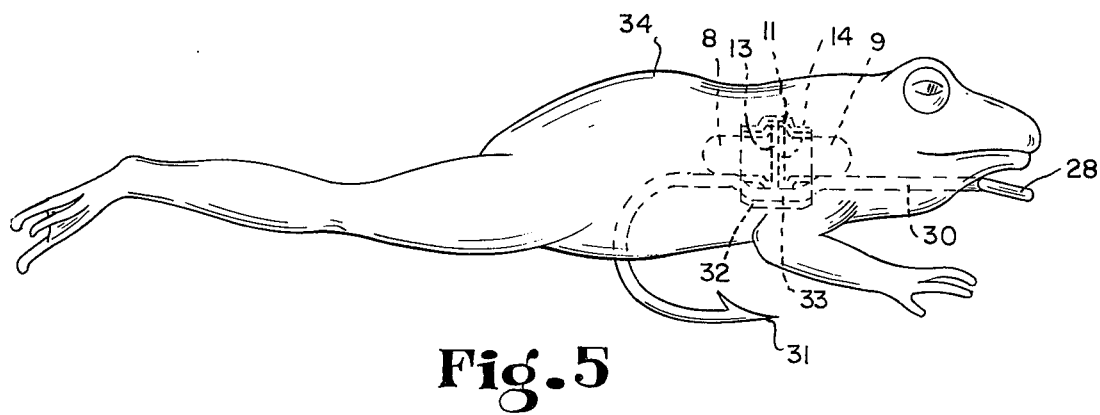
FIG. 5 is a side view showing a device in accordance with the invention molded together with a hook in a soft plastic frog-shaped lure body.

The lure shown in FIG. 5 contains such a combined fish hook and noisemaker 17 of FIG. 4, molded into a soft plastic body resembling that of a frog. The eyelet 28 of the fish hook 30 protrudes from the front of the lure. The noisemaking device 17 carried by the shank of the fish hook lies within the frog-shaped body, and the point of the hook protrudes below that body.

Figure 6:
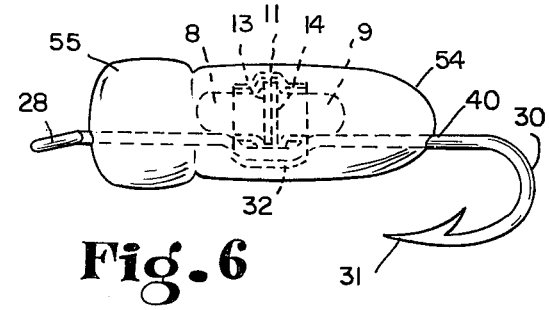
FIG. 6 is a side view of the device assembled with a molded jig of lead or plastic.

In the arrangement shown in FIG. 6, a combined noisemaking device 17 and fish hook 30 as shown in FIG. 4 is molded into a lead jig having a head portion 55 and a body portion 54. The eye 28 of the hook 30 protrudes from the head 55 of the jig. The shank of hook 30 runs through the head 55 and the body 54 at the lead jig and protrudes from the rear of the body 54 at location 40. In the use of the jig, ornamental feathers or animal hair are typically attached to the jig at location 40. Lead jigs of this type are commonly made with hooks having notches on their shanks which serve to fix the position of hook 30 with respect to the lead jig. In the present device, the flanged portion of the noisemaker and the offset notch 33 of the hook serve to fix the position of the hook and noisemaker in the lure. As the lead or plastic forming the body of the lure is being poured into a mold in which the combined hook and noisemaker apparatus of FIG. 4 is located, the lead or plastic forms around the flanges 13 and 14 and about the notch 33 and holds the noisemaker and hook in fixed position with respect to the lure body.

Figure 7:
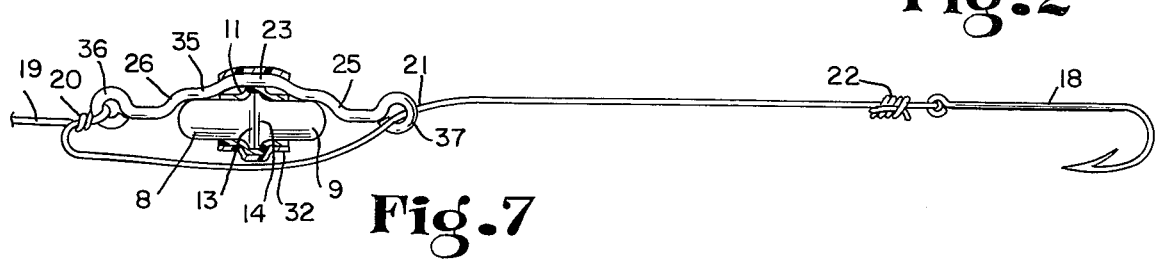
FIG. 7 is a side view of any device assembled with a wire harness or yoke and enclosed by a molded envelope.

In the device of FIG. 7, a noisemaking device 17 of FIG. 2 is combined with a wire harness 35 to form a unit which can be connected at any point in a fishing line. The wire harness 35 has a pair of eyelets 36 and 37 at its ends, and its intermediate portion is bent to conform to the side of the noisemaker 17. It thus has a central offset 23 to clear the abutted flanges 13 and 14 of the cups 8 and 9, and is bent at points 25 and 26 to follow the contours of the ends 15 and 16 of the cups 8 and 9. The wire harness can be attached to the noisemaker 17 in any convenient way. As shown in FIG. 7, a noisemaking device 17, assembled as in FIG. 2, is attached to the harness by an outer sleeve 32 of heat-shrinkable tubing. In assembly, the harness 35 and noisemaking device 17 are brought together, and the sleeve is placed about them. The sleeve desirably has a snug fit sufficient to retain the parts together for further processing. The assembly is then heated to cause the sleeve to shrink into place and secure the parts permanently together. Alternatively, or in addition, the harness 35 and noisemaking device 17 may be encased in a molded envelope extending over the entire length of the assembly between the eyes 36 and 37.

In use, the unit shown in FIG. 7 may be attached at any desired point along the length of a fishing line. As shown, a line 19 is passed through the eyelet 36 of the wire harness 35 and tied with a knot 20. The line is then passed through the eyelet 37 at the opposite end of the wire harness 35 and then attached to a fish hook 18 by a knot 22. However, the line 19 need not be continuous, and separate lengths of line can be tied to the two eyelets 36 and 37 of the assembly.

What is claimed is:

1. A noisemaking device for use with a fishing lure or bait comprising:
    first and second metal cups each having a closed end and an open, flanged end, assembled with their flanged ends in abutting relation to form a closed container;
    one or more metal balls loosely received in said container;
    and a shrinkable sleeve surrounding the abutting flanged ends of said cups and shrunk about the same to secure the cups in assembled relation.

2. A noisemaking device according to claim 1 wherein the shrinkable sleeve is a length of heat-shrinkable tubing.

3. A noisemaking device according to claim 2 wherein the sleeve is of a length to overlap the flanged ends of both cups and is shrunk at its ends into tight engagement with the tubular side walls of the cups.

4. A noisemaking device as in claim 1 assembled to a metal shaft extending lengthwise alongside said device and having an offset portion bridging said abutting flanged ends.

5. A noisemaking device according to claim 4 wherein said metal shaft is the shank of a fish hook.

6. A noisemaking device according to claim 4 wherin said metal shaft is a wire harness having attaching means at its ends.

7. A noisemaking device as in claim 1 molded in place in a molded fishing lure, the assembled flanged ends of the device and their overlying sleeve forming an annular rib about the device which is closely surrounded by the molded material of the lure to secure the device in place in the lure.

8. The method of making a noisemaking device for use with a fishing lure or bait comprising the steps of:
    inserting one or more metal balls into the cavity formed in a first metal tube with one closed end and one open, flanged end;
    placing the flanged end of a second metal tube having an open, flanged end and a closed end in abutting relationship with the flanged end of said first tube;
    placing a sleeve of shrinkable tubing about the abutting flanged ends of said first and second metal tubes; and
    shrinking said sleeve about said abutting flanges of said first and second metal tubes to form a closed container within which said one or more metal balls are free to move and thereby cause noise to be produced.

9. The method of claim 8 in which the shrinkable tubing is heat-shrinkable and is shrunk in place by heating.

10. The method according to claim 8 with the addition of placing a metal shaft alongside the assembled device, and forming a securing band about such shaft to secure the shaft in supporting relation with the device.

11. The method according to claim 10 wherein said metal shaft is the shank of a fish hook.

12. The method according to claim 10 wherein said metal shaft is a wire harness.

13. The method of claim 8 with the addition of molding a lure body about the device and in closely embracing relation with the rib formed by the flanged ends and their surrounding sleeve to secure the device in place in the lure.

14. The method of claim 9 in which said tubing has a pre-shrunk diameter of a size to snugly engage the abutting flanges to retain the same in assembled relation for subsequent processing.

* * * * *